US006488346B2

(12) United States Patent
Chen

(10) Patent No.: US 6,488,346 B2
(45) Date of Patent: Dec. 3, 2002

(54) TOOLBOX

(76) Inventor: Kun-Chen Chen, No. 6, Lane 609, Sec. 1, Chung-Shan Rd., Ye-Her Li, Tachia Chen, Taichung Hsien (TW)

( * ) Notice: Subject to any disclaimer, the term of this patent is extended or adjusted under 35 U.S.C. 154(b) by 0 days.

(21) Appl. No.: 09/792,558

(22) Filed: Feb. 23, 2001

(65) Prior Publication Data

US 2002/0117944 A1 Aug. 29, 2002

(51) Int. Cl.[7] .................................................. F16B 12/00
(52) U.S. Cl. ........................................ 312/263; 312/111
(58) Field of Search .............................. 312/257.1, 263, 312/265.5, 107, 108, 111, 902, 235.5, 249.11, 249.8; 220/4.27, 4.28, 4.34

(56) References Cited

U.S. PATENT DOCUMENTS

| | | | | | |
|---|---|---|---|---|---|
| 310,149 | A | * | 12/1884 | Protzman | 312/235.5 |
| 3,722,971 | A | * | 3/1973 | Zeischegg | 312/107 |
| 4,171,150 | A | * | 10/1979 | Soderlund | 312/107 |
| 4,305,504 | A | * | 12/1981 | Bredal | 220/4.27 |
| 5,294,196 | A | * | 3/1994 | Chen | 312/263 |
| 5,368,380 | A | * | 11/1994 | Mottmiller et al. | 312/263 |
| 5,372,415 | A | * | 12/1994 | Tisbo et al. | 312/108 |
| 5,466,058 | A | * | 11/1995 | Chan | 312/111 |
| 5,704,699 | A | * | 1/1998 | Pagelow et al. | 312/257.1 |
| 5,997,112 | A | * | 12/1999 | Karten et al. | 312/140.2 |
| 6,113,203 | A | * | 9/2000 | Chen | 312/263 X |

* cited by examiner

*Primary Examiner*—Janet M. Wilkens
(74) *Attorney, Agent, or Firm*—Dellett and Walters

(57) ABSTRACT

A toolbox includes at least one case having a bottom panel, two side panels, a back panel and a top panel connected together to form an internal space. The connecting devices between these panels are integral keys and are corresponding slots respectively formed on the abutting surfaces on the panels. Consequently, these panels can be connected to one another without separate fasteners. A locking lip is formed on the top edge of the side panels and the back panel, and a corresponding locking wall is formed on one side of the top panel opposite to the back panel. Multiple ridges extend out laterally from the top edge of the locking lip and locking wall so a seat or a working table can be attached to the top of the toolbox to make the toolbox more useful.

5 Claims, 6 Drawing Sheets

TOOLBOX

BACKGROUND OF THE INVENTION

1. Field of the Invention

The present invention relates to a toolbox, and more particularly to a toolbox that may be used as a seat or a working table and a tool cabinet or toolbox.

2. Description of Related Art

A conventional toolbox in accordance with the prior art comprises multiple panels individually manufactured and assembled to form the toolbox. Multiple fasteners are needed to attach the panels to each other. The conventional toolbox usually contains a large internal space and has several partitions to divide the space into multiple chambers to hold various hand tools. However, a lot of time is required to assemble the panels and partitions with the threaded fasteners. Further, most hand tools are made of metal, and the toolbox becomes very heavy and hard to move when the toolbox is full of hand tools.

The present invention has arisen to mitigate and/or obviate the disadvantages of the conventional toolbox.

SUMMARY OF THE INVENTION

In accordance with one aspect of the present invention, a toolbox includes at least one box each having a bottom panel, two side panels, a back panel and a top panel coupled together to form an internal space. A locking lip is formed on the top edge of the side panels and back panel and on the edge of the top panel opposite to the back panel. Multiple ridges extend out laterally from the lips so a seat or a working table can be attached to extend the scope for which the toolbox in accordance with the present invention can be used.

Further benefits and advantages of the present invention will become apparent after a careful reading of the detailed description with appropriate reference to the accompanying drawings.

DETAILED DESCRIPTION OF THE INVENTION

Figure 1:
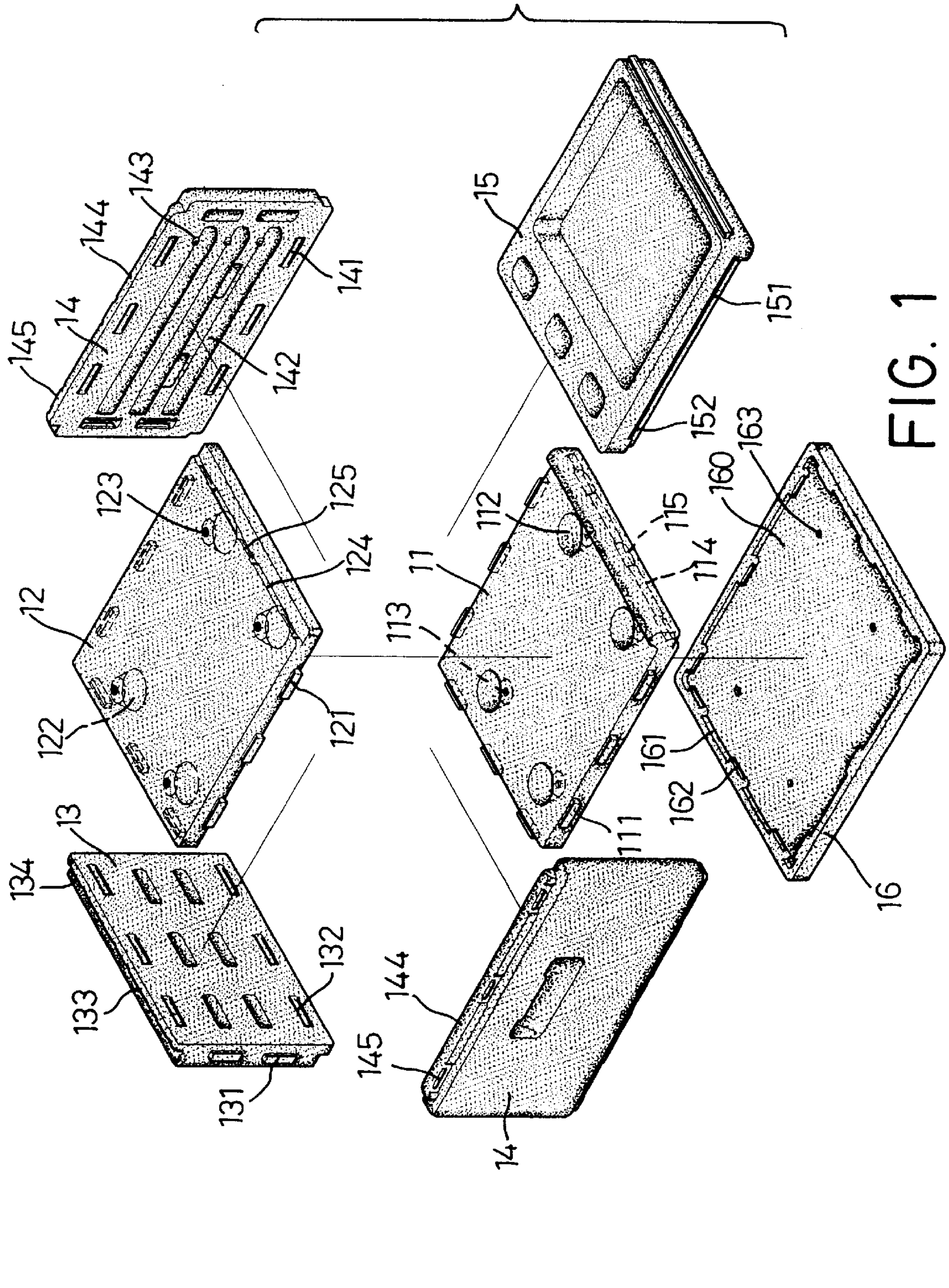
FIG. 1 is an exploded perspective view of a toolbox in accordance with the present invention.
Figure 5:
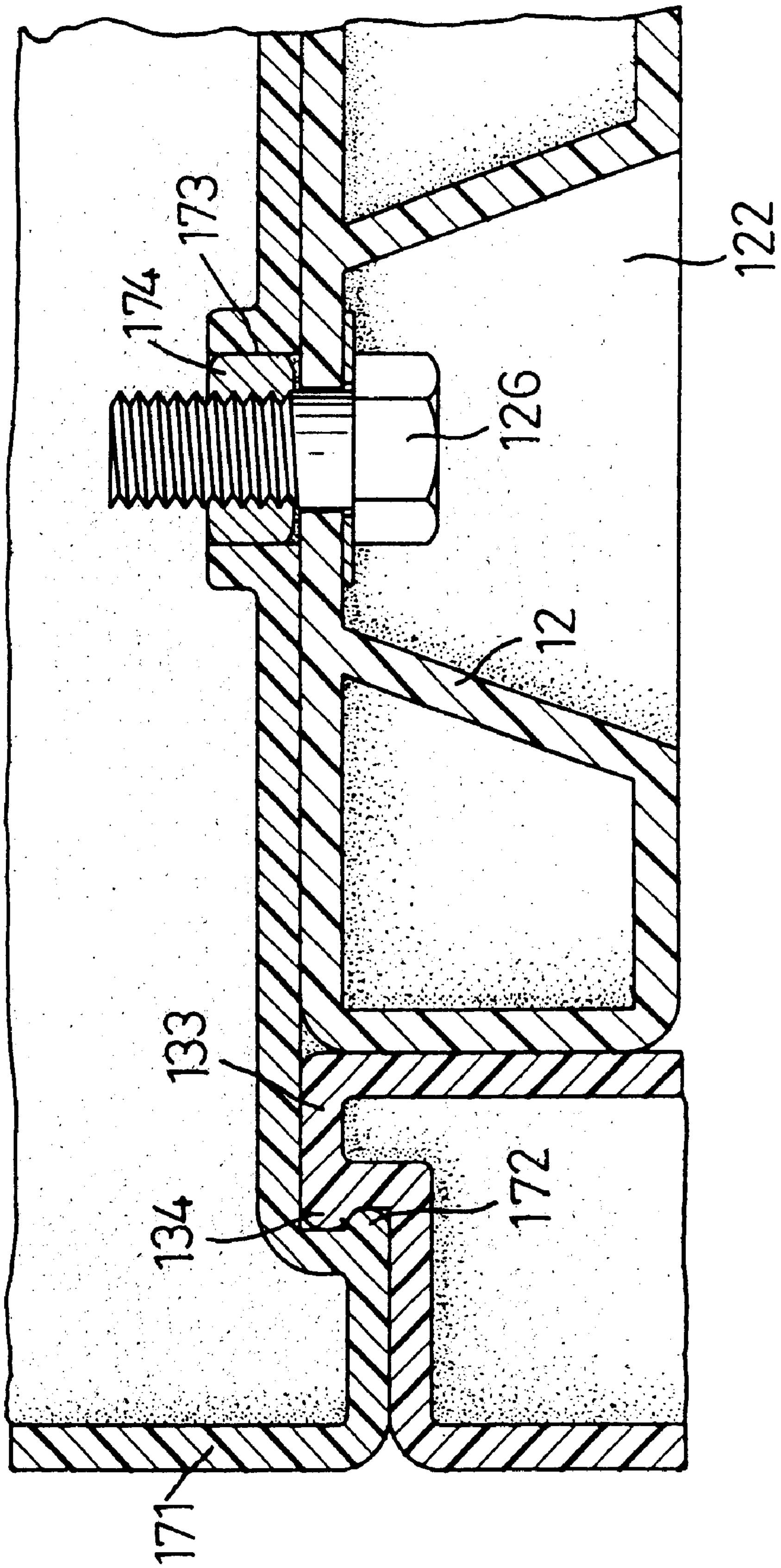
FIG. 5 is an enlarged partial side plan view in partial section of the top panel, the back panel and the seat in FIG. 2.
Figure 6:
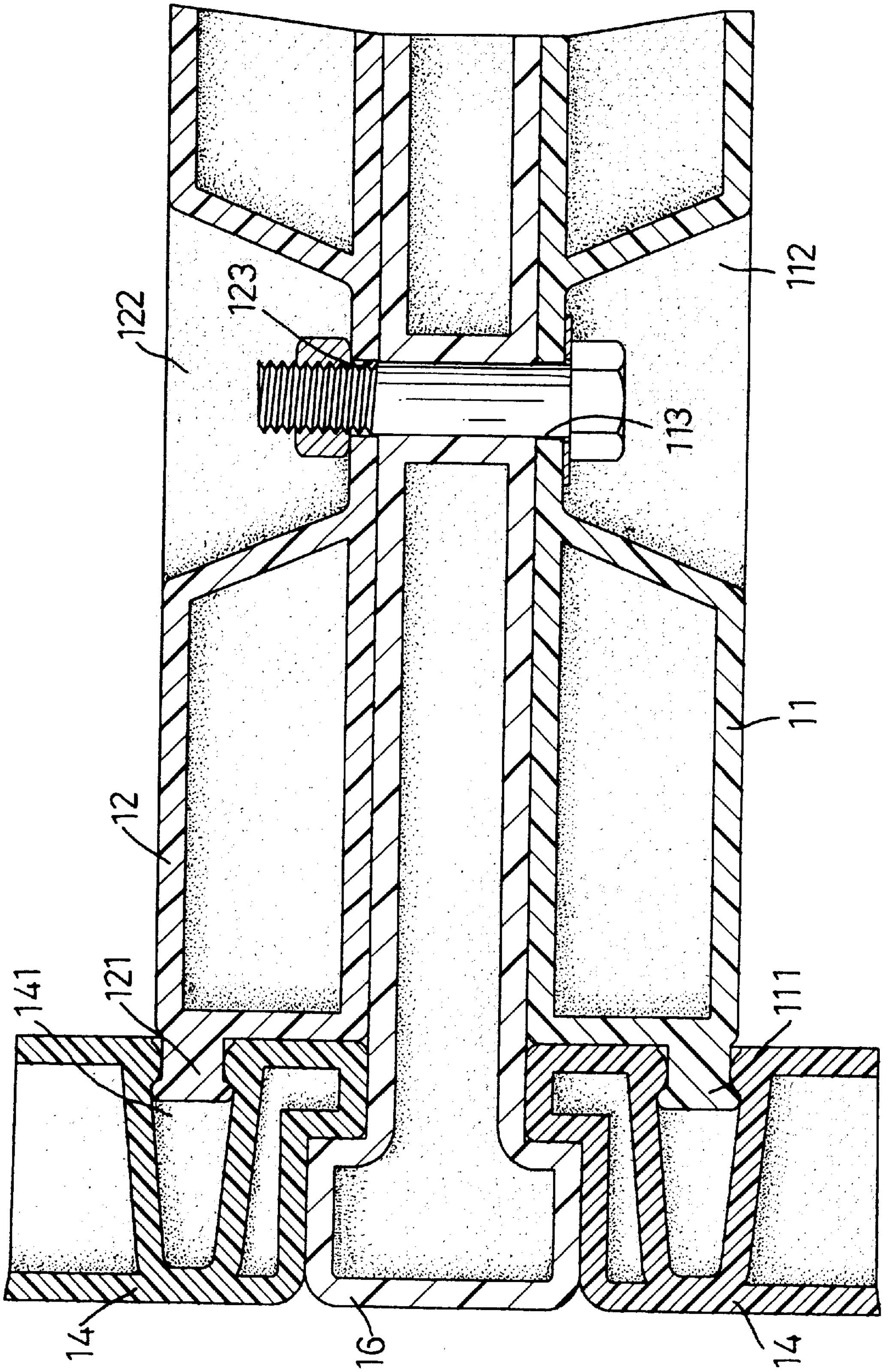
FIG. 6 is an enlarged partial side plan view of the second embodiment of the toolbox in FIG. 3 showing how the two boxes are attached to each other.

With reference to the drawings and initially to FIGS. 1, 5 and 6, a toolbox in accordance with the present invention comprises at least one case (10) each including a bottom panel (11), a top panel (12), a back panel (13) and two side panels (14) coupled together to form a hexahedron and an internal space in the case (10). The side of the box opposite to the back panel is open and allows access to the internal space in the case (10) from the outside of the case (10).

The devices formed on the panels (11, 12, 13, 14) used to connect the panels (11, 12, 13, 14) are integral keys (111, 121, 131) and corresponding slots (141, 132). The keys (111, 121, 131) are formed on the edges of the bottom panel (11), the top panel (12) and the back panel (13). The corresponding slots (141, 132) are formed on the internal face of the back panel (13) and the two side panels (14). The keys (111, 121, 131) and the corresponding slots (141, 132) are T-shaped, and the keys (111, 121, 131) are pressed into and secured in the corresponding slots (141, 132).

The internal sides of the two side panels (14) are parallel to each other and have multiple rails (142) extending laterally across the interior face of the side panels (14). Multiple drawers (15) are received in the interior space of the case (10) and slide on the rails (142). Each of the rails (142) on the side panel (14) has a stop (143) formed near the open side of the case (10). A groove (151) is defined in side edge of each drawer (15) corresponding to the side panels (14) to slide on the corresponding rail (142). The groove (151) includes a block (152) formed on one end opposite to the stop (143) of the side panel (14) to prevent the drawer (15) from accidentally detaching from the rail (142).

The bottom panel (11) and the top panel (12) each has at least three cavities (112, 122). Each cavity (112, 122) has a bottom with a through hole (113, 123) defined in the bottom of the cavities (112, 122). The cavities (112) and the through holes (122) of the bottom panel (11) respectively align with the cavities (122) and the through holes (123) of the top panel (12).

The two side panels (14) and the back panel (13) each includes two locking lips (144, 133) respectively extending from the top and the bottom edges of the panels (13, 14). The locking lips (144, 133) are flush with the top panel (12), the internal sides of the back panel (13) tend the two side panels (14). The locking lip (133) of the back panel (13) is situated between the end of the two side panels (14) locking lips (144). The top panel (12) and the bottom panel (11) each has a cutout defined in one side opposite to the back panel (13) to form a locking wall (114, 124) between the other end of the locking lips (144) of the two side panels (14). Multiple ridges (134, 145) extend laterally out from the edge of the locking lips (133, 144) on the back panel (13) and the two side panels (14). Multiple ridges (115, 125) extend out laterally from the edge of the locking wall (114, 124). The ridges (125) on the top panel (12) and the bottom panel (11) are the same as the ridges (134, 145) on the back panel (13) and the side panels (14). The locking lips (133, 144) on the back panel (13), the side panels (14) and the locking wall (114) of the bottom panel (11) form a quadrangle for mounting a connecting panel (16) that may have rollers (164) mounted thereon. The locking lips (133, 144) on the back panel (13), the side panels (14) and the locking wall (124) of the top panel (12) form a quadrangle for mounting another structure such as a seat (17), a working table (18), a connecting panel (16) for mounting another case (10), etc. Besides widening the scope of use of the toolbox in accordance with the present invention, the device mounted on the quadrangle positively locks the pieces together.

The connecting panel (16) includes a first side abutting the bottom panel (11) and a second side opposite to the case (10). Each side of the connecting panel (16) has recess (160)

defined to correspond to the quadrangle formed by the locking lips (133, 144) on the back panel (13), the side panels (14) and the locking wall (124) of the bottom panel (11). The recess (160) includes four sidewalls (161) each having multiple locking lips (162) inward and laterally extending to engage with the locking lips (133, 144) on the back panel (13), the side panels (14) and the locking wall (124) of the bottom panel (11). Multiple holes (163) are defined in the connecting panel (16) and communicate with the two recesses (160) of the connecting panel (16). Each of the holes (163) of the connecting panel (16) aligning with a corresponding one of the through holes (113, 123) of the bottom panel (11) and the top panel (12).

Figure 2:
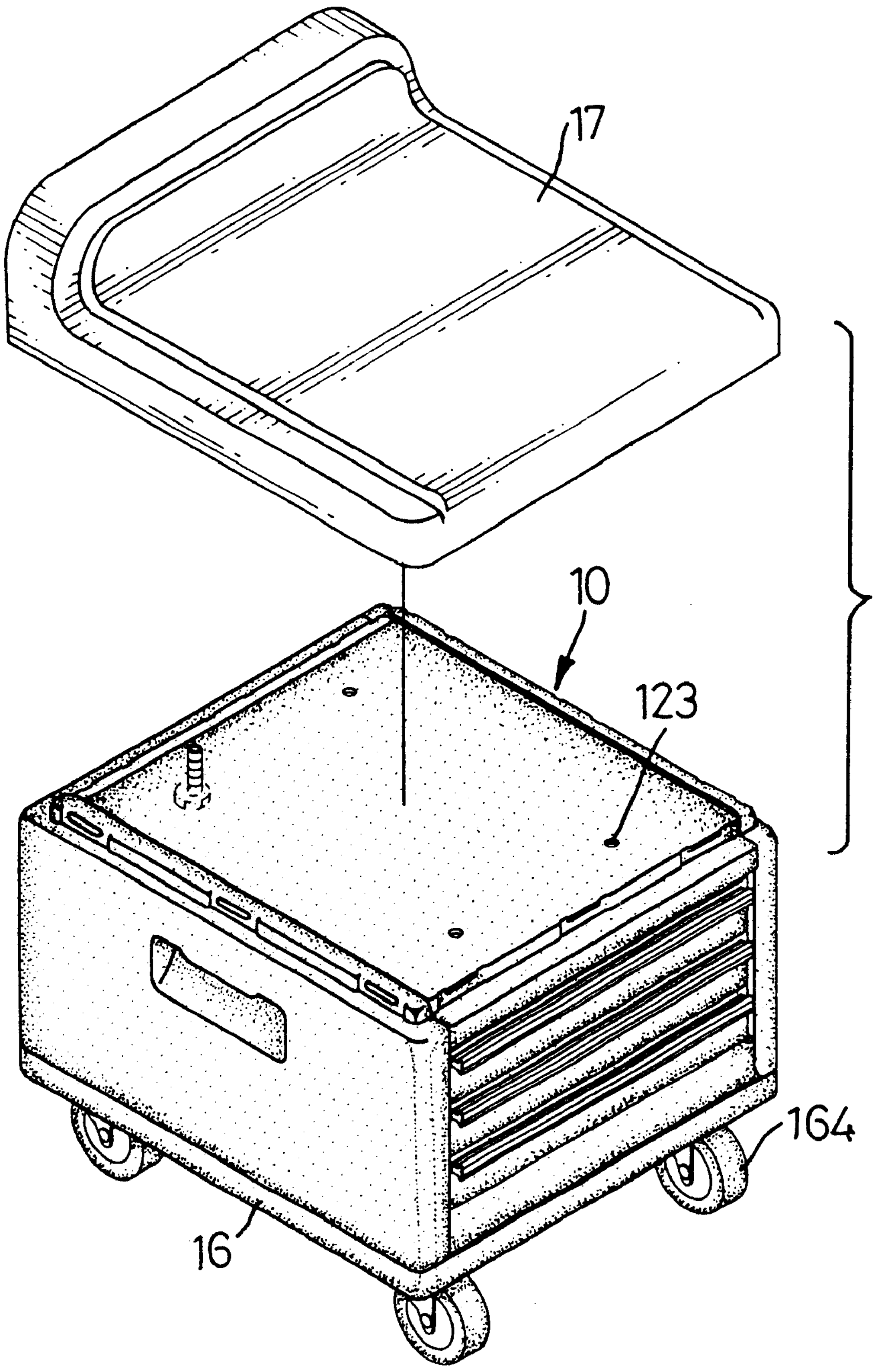
FIG. 2 perspective view of the first embodiment of the toolbox with a seat shown in phantom lines for illustrative purposes.

With reference to FIGS. 1 and 2, a roller (164) is mounted in each of the holes (163) in the connecting panel (16) of the bottom case (10) so that the toolbox is easily moved. The roller (164) has a bolt (not shown) that is inserted through the hole (163) of the connecting panel (16) and the through hole (113). A nut (not shown) is screwed on the bolt of the roller (164) to hold the roller (164) in place after the bolt of the roller (164) being inserted through the hole (183) of the connecting panel (16) and the through hole (113). Further referring to the FIG. 5, a skirt (171) extends from the bottom of the seat (17), work table (18) or cover (19) mounted on the quadrangle. The shape of the skirt (171) corresponds to the quadrangle that is formed by the locking wall (124) and the locking lips (133, 144) of the back panel (13) and the side panels (14). A hooked lip (172) extends inward from the end of the skirt (171). The hooked lip (172) clamps on the ridges (134, 145, 125) of the back panel (13), the side panels (14) and the locking wall (124) of the top panel (12) to secure the seat (17) on the top of the case (10). The bottom of the seat (17) contains multiple holes (173) extending into the inside of the seat (17). A nut (174) is secured in each of the holes (173) and aligns with a corresponding one of the through holes (123) in the top panel (12). A bolt (126) is inserted into the through hole (123) of the top panel (12) and is securely screwed into the nut (174) after the seat (17) is attached to the top panel (12) of the case (10).

Figure 3:
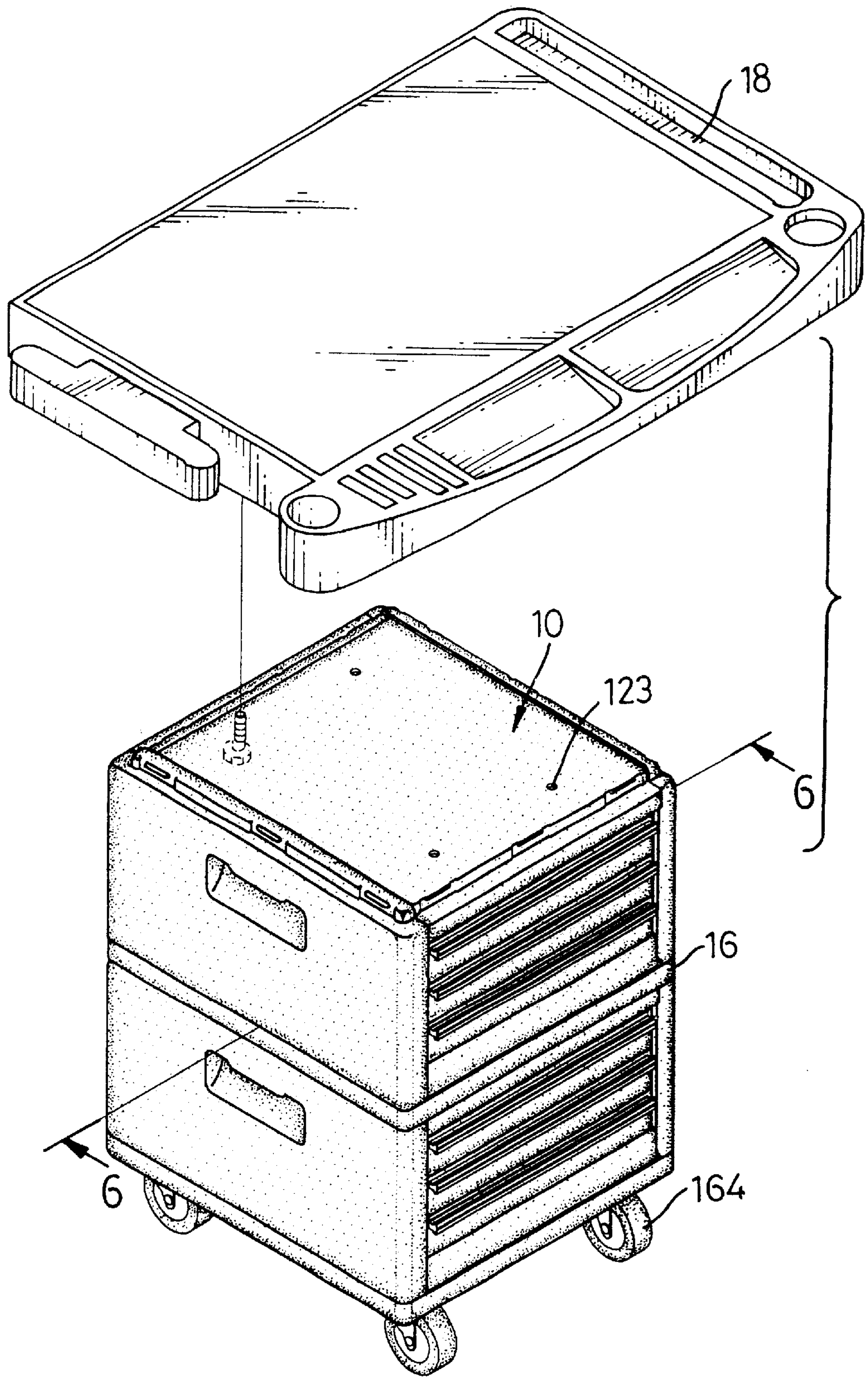
FIG. 3 is a perspective view of the second embodiment of the toolbox with a worktable shown in phantom lines for illustrative purposes.

With reference to FIGS. 3 and 6, in a second preferred embodiment of the toolbox in accordance with the present invention, the seat (17) on the bottom case (10) in FIG. 2 is replaced with another case (10), and a working table (18) is attached to the top of the upper case (10). The connection between the case (10) and the working table (18) is the same as that between the seat (17) and the case (10). To connect the two cases (10) together, a connecting panel (16) is mounted between the two cases (10). The quadrangle formed on top of the bottom case (10) is inserted into the lower recess (160) of the connecting panel (16) and the quadrangle formed on the bottom of the top case (10) is inserted into the upper recess (160) of the connecting panel (16). A bolt (126) penetrates the through hole (113) in the bottom panel (11) of the upper case (10), the hole (163) of the connecting panel (16) between the two cases (10) and the through hole (123) in the top panel (12) of the lower case (10). A nut (114) is screwed onto the bolt (126) to securely connect the two cases (10) together.

Figure 4:
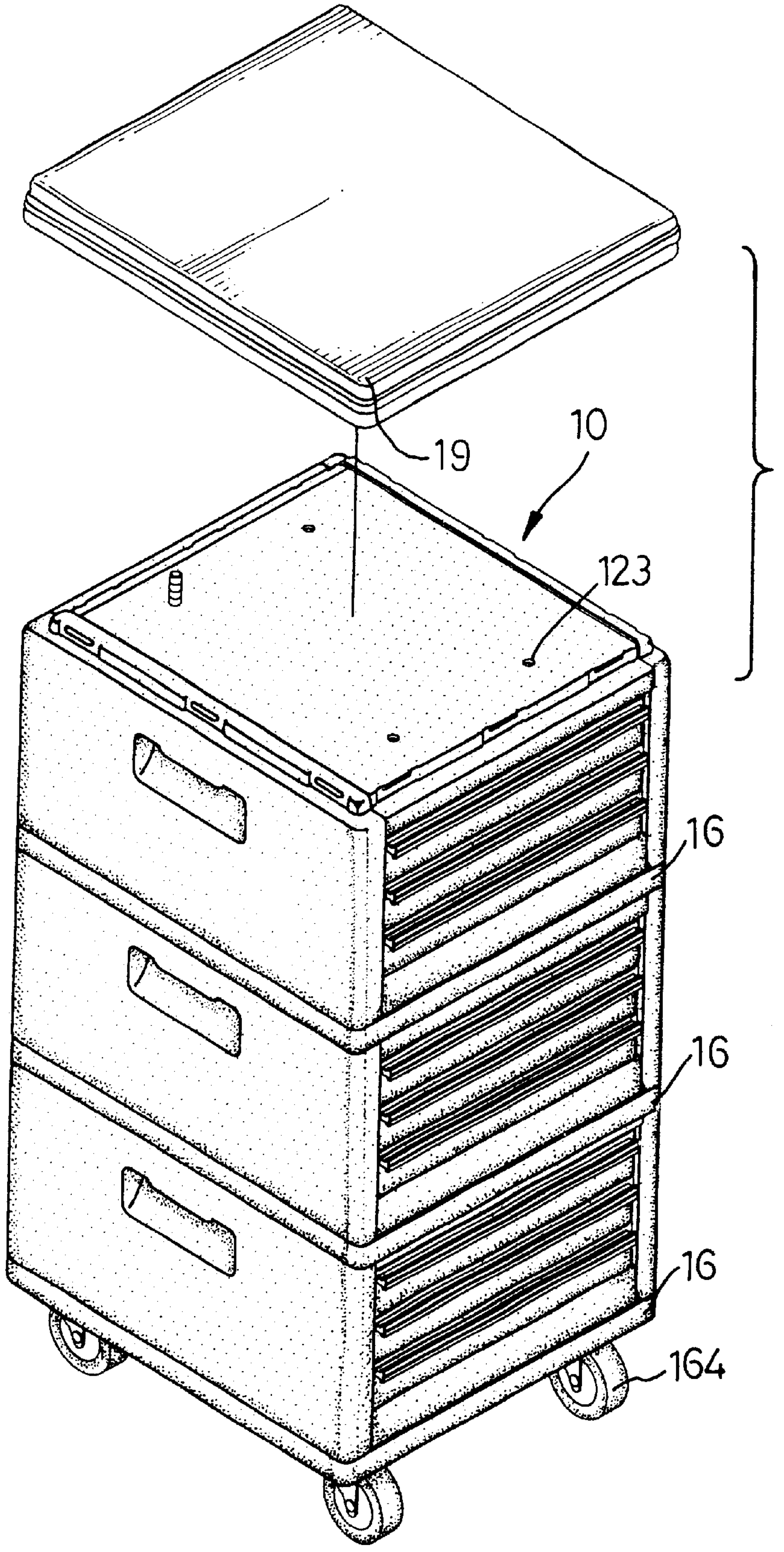
FIG. 4 is a partially exploded perspective view of the third embodiment of the toolbox with a top cover shown for illustrative purposes.

With reference to FIG. 4, in a third preferred embodiment of the toolbox in accordance with the present invention, the working table (18) in FIG. 3 is replaced with another case (10), and a cover (19) is attached to the upper case (10). The connection between the case (10) and the cover (19) is the same as that between the seat (17) and the case (10).

The toolbox in accordance with the present invention has the following advantages.

1. Fasteners are unnecessary. The panels of the present invention are connected by inserting the keys into the slots to save the time in assembly.

2. A seat or a working table can be attached to the top of the toolbox to make the toolbox more useful and more convenient.

Although the invention has been explained in relation to its preferred embodiment, it is to be understood that many other possible modifications and variations can be made without departing from the spirit and scope of the invention as hereinafter claimed.

What is claimed is:

1. A toolbox formed by at least one case, said case comprising:

a bottom panel having a cutout defined in a first side to form a locking wall;

said locking wall having multiple ridges laterally extending from a bottom of said locking wall;

a top panel having a cutout defined in a first side to form a locking wall corresponding to said locking wall of said bottom panel, said locking wall of said top panel having multiple ridges laterally extending from a top of said locking wall of said top panel;

two side panels each including two locking lips respectively extending from a top and a bottom edge and flush with a top of said top panel, a bottom of said bottom panel and two internal sides of said two side panels, each of said two side panels having multiple ridges respectively extending laterally from a free end of each of said locking lips, a back panel including two locking lips respectively extending from a top and a bottom edge and flush with said top of said top panel, said bottom of said bottom panel and an internal side of said back panel, said back panel having multiple ridges respectively extending laterally from a free end of each of said locking lips of said back panel;

whereby said bottom panel, said top panel, said back panel and said two side panels are connected to one another to form a hexahedron and an open side communicating with an interior space in said case, said locking lips of said back panel, said two side panels and said locking wall of said top panel form a first quadrangle for mounting an object on said case, and said locking lips of said back panel, said two side panels and said locking wall of said bottom panel form a second quadrangle;

a connecting panel mounted on said second quadrangle, said connecting panel including a first side abutting said bottom panel and a second side opposite to said case, each side of said connecting panel having a recess defined to respectively securely receive said second quadrangle of said case and a first quadrangle of another case, multiple connecting devices formed on abutting surfaces of said panels and including keys extending from edges of said panels and corresponding slots defined in corresponding interior faces of said panels for fixedly receiving said keys; and multiple drawers slidably received in said interior space of said case.

2. The toolbox as claimed in claim 1, wherein said side panels each has said internal side parallel to each other and having multiple rails extending laterally along the face, said drawers respectively sliding on said rails, each of said rails having a stop formed near said open side of said case, a groove defined in two opposite edges and corresponding to said side panels to partially receive a respective one of said rails, a block formed in one end of said groove opposite to said stop to prevent said drawers from accidentally detaching from said rails.

3. The toolbox as claimed in claim 1, wherein said bottom panel and said top panel each comprises at least three cavities each having a bottom with a through hole defined in said bottom of said cavities, said cavities and said through holes of said bottom panel each aligning with a corresponding one of said cavities and said through holes of said top panel, and said connecting panel comprises at least three holes defined to communicate with said two recesses of said connecting panel, each of said holes of said connecting panel aligning with a corresponding one of the through holes of said bottom panel.

4. The toolbox as claimed in claim 3 further comprising multiple rollers corresponding to said holes of said connecting panel and each of said rollers including a bolt extending through a respective aligned pair of said holes of said connecting panel and said through holes of said bottom panel, and a nut secured on each of said bolts to hold said rollers in place, and a seat mounted on said top panel, said seat having a skirt extending toward said case from a bottom of said seat, said skirt having a shape corresponding to said first quadrangle, said skirt having a hooked lip extending inward from a free end of said skirt to clamp on said sides of said back panel, said side panels and said locking wall of said top panel to secure said seat on the top of said case.

5. The toolbox as claimed in claim 4, wherein said seat comprises a bottom containing multiple holes extending into the inside of said seat, multiple nuts corresponding to said multiple holes and each nut secured in a respective one of said holes and aligning with a corresponding one of said through holes of said top panel, multiple bolts corresponding to said through holes of said top panel and each bolt securely screwed into a respective one of said nuts after said seat is attached to said top of said case.

* * * * *